May 1, 1962  W. L. BLACKBURN  3,032,021
OPPOSED PISTON TYPE ENGINE
Filed July 8, 1960  12 Sheets-Sheet 5

Walter L. Blackburn
INVENTOR.

BY James F. Weiler
Jefferson D. Giller
William A. Stout

ATTORNEYS

May 1, 1962 W. L. BLACKBURN 3,032,021
OPPOSED PISTON TYPE ENGINE
Filed July 8, 1960 12 Sheets-Sheet 6

Walter L. Blackburn
INVENTOR.

BY James F. Weiler
Jefferson D. Giller
William A. Stout

ATTORNEYS

May 1, 1962 W. L. BLACKBURN 3,032,021
OPPOSED PISTON TYPE ENGINE
Filed July 8, 1960 12 Sheets-Sheet 10

Walter L. Blackburn
INVENTOR.

BY James F. Weiler
Jefferson D. Giller
William A. Stout
ATTORNEYS

May 1, 1962 W. L. BLACKBURN 3,032,021
OPPOSED PISTON TYPE ENGINE
Filed July 8, 1960 12 Sheets-Sheet 12

Fig. 25

Walter L. Blackburn
INVENTOR.

BY James F. Weiler
Jefferson D. Gilbert
William A. Stout
ATTORNEYS

United States Patent Office 3,032,021
Patented May 1, 1962

3,032,021
OPPOSED PISTON TYPE ENGINE
Walter L. Blackburn, 6105 England, Houston, Tex.
Filed July 8, 1960, Ser. No. 42,193
8 Claims. (Cl. 123—51)

The present invention relates to improved opposed piston type engines in which the cylinder is reciprocated. The present application constitutes a continuation-in-part of application Serial Number 696,711 filed November 15, 1957 and also a continuation-in-part of application Serial Number 751,458, filed July 28, 1958, both of which applications, now abandoned, are combined in and constitute the present application.

In theory there is a distinct advantage in engines of the opposed piston type by reciprocating the sleeve or liner of the cylinder or by reciprocating the cylinder itself. Among the advantages are that substantially perfect timing is obtained in that one piston does not trail the other piston, the exhaust and inlet ports opening and closing are controlled so that exhaust turbocharging and inlet supercharging is improved, and efficiency is greatly increased due to the fact that both pistons are in position to expand upon combustion in that one is not in a trailing position with respect to the other.

In practice, however, opposed piston type engines of the reciprocating sleeve or liner type have not been entirely satisfactory for a number of reasons, among which are the difficulty of providing proper cooling for the moving liner or sleeve.

Accordingly, it is an object of the present invention to provide an engine of the opposed piston type which includes means by which the cylinder itself is reciprocated and includes means by which it is cooled efficiently and effectively under all operating conditions.

Yet a further object of the present invention is the provision of an improved engine of the opposed piston type in which the cylinder is reciprocated and which includes a cooling jacket constructed and arranged to move with the cylinder.

Still a further object of the present invention is an improved engine of the opposed piston type in which substantially perfect timing is achieved in that one piston does not trail the other but both are in a position to expand upon combustion and in which means are provided so that the exhaust turbocharging and inlet supercharging are improved.

Still a further object of the present invention is the provision of an improved engine of the opposed piston type in which the cylinder is reciprocated and in which the efficiency is increased and more efficient idling is achieved.

Still a further object of this invention is the provision of means by which the exhaust ports are closed sooner thereby providing a longer effective compression stroke.

Still a further object of this invention is the provision of controlled port closing so that the inlet ports are open longer after the exhaust ports are closed thereby by providing increased supercharging.

Still a further object of the present invention is the provision of an improved engine of the opposed piston type which utilizes simplified means for reciprocating the cylinder.

Still a further object of the present invention is the provision of improved cooling means for an engine of any type which includes cooling passages formed through the exhaust port bridges.

In some instances it is desirable that the liner or cylinder not move as a unit with respect to the opposed pistons. In one of its aspects the present invention is directed to opposed piston type engines in which the cylinder is split and either or both the exhaust portion and inlet portion of the cylinder are separately moved in order to control the opening and closing of the exhaust and inlet ports and the combustion zone is stationary so that it may be cooled without any movement with respect to the cooling jacket or means.

Accordingly, it is an object of the present invention to provide an engine of the opposed piston type which includes a split cylinder in which at least one part of the cylinder is separately reciprocated.

Yet a further object of the present invention is the provision of an engine of the opposed piston type in which the combustion chamber and cooling system are stationary and in which the cylinders adjacent the combustion chamber are independently movable.

Still a further object of the present invention is an improved engine of the opposed piston type in which movement of one portion of the cylinder controls the opening and closing of the exhaust ports in combination with the piston and independent movement of the other portion of the cylinder controls the opening and closing of the inlet ports in combination with a second piston in the cylinder.

Yet a further object of the present invention is the provision of an improved engine of the opposed cylinder type which utilize improved means for reciprocating the cylinder or portions thereof.

Yet a further object of the present invention is the provision of improved cooling in that the combustion and cooling chamber remains stationary and the split halves of the cylinder are reciprocated relative to the cooled combustion chamber.

Other and further objects, features and advantages will be apparent from the following description of presently preferred embodiments of the invention, given for the purpose of disclosure, and taken in conjunction with the accompanying drawings, where like character references designate like parts throughout the several views, and where:

Figure 6:
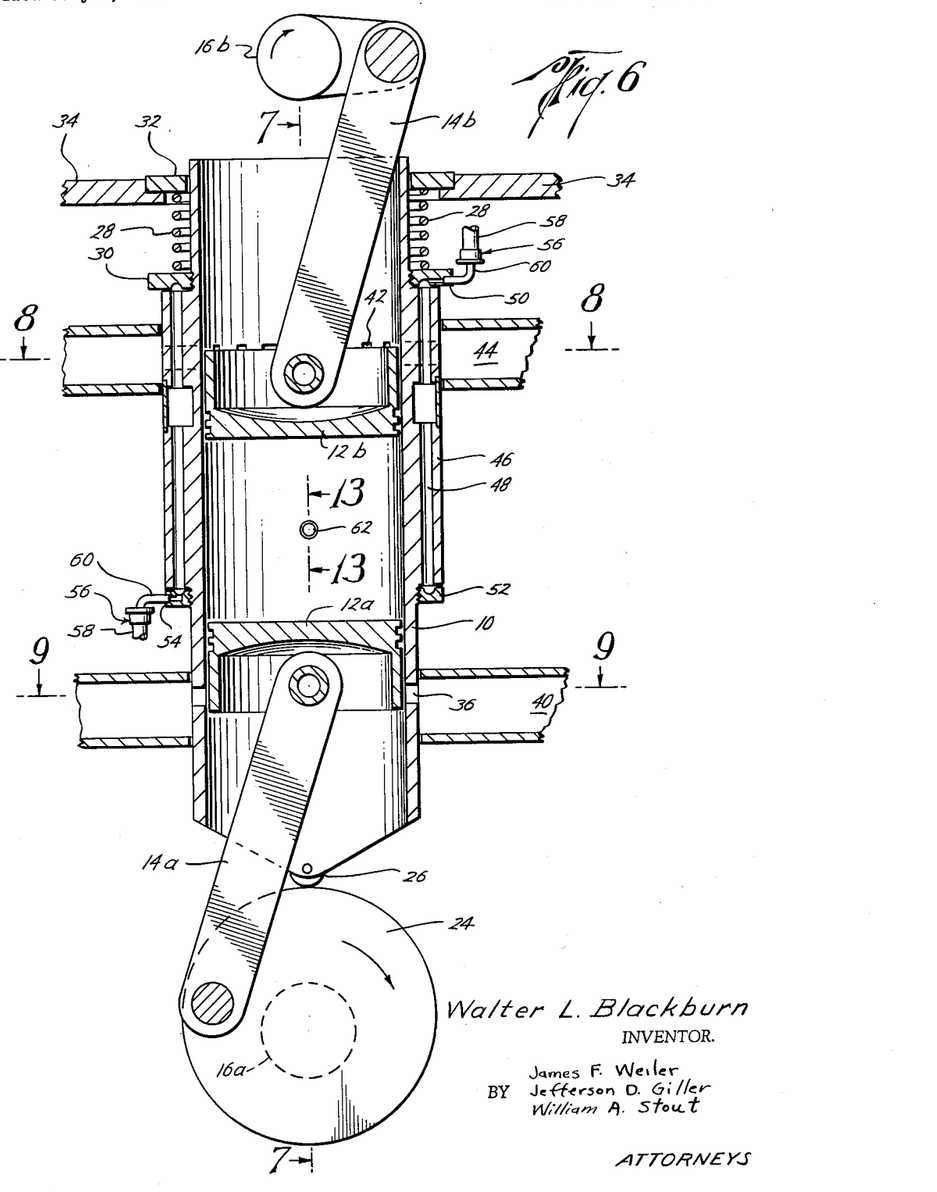
FIGURE 6 is a fragmentary, side section illustrating an engine constructed according to the invention and as schematically shown in FIGURES 1–4, inclusive.
Figure 7:
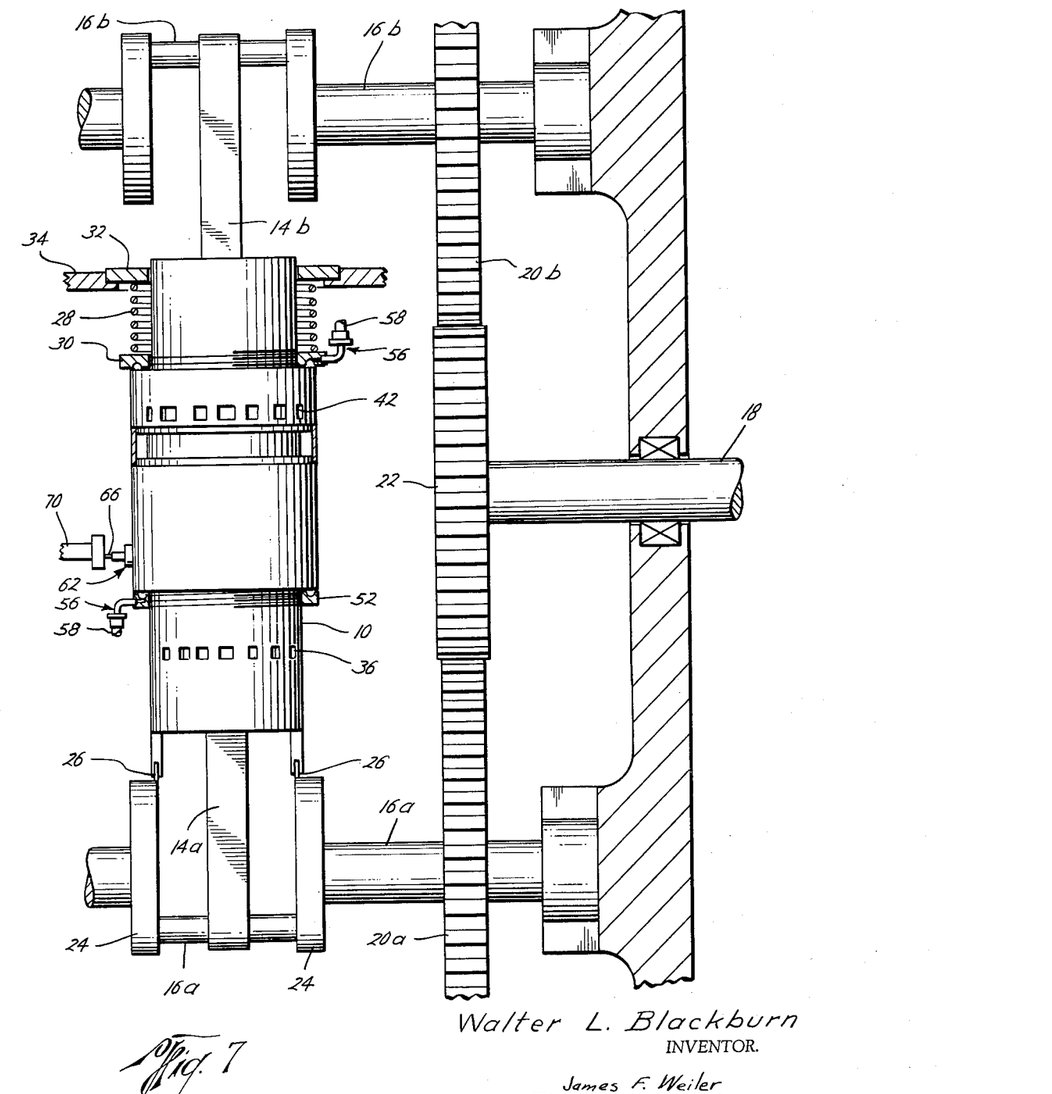
FIGURE 7 is a sectional view taken along the line 7—7 of FIGURE 6.

Referring now to the drawings, and particularly to FIGURES 6 and 7, a reciprocating cylinder 10 is illustrated having the opposed pistons 12a and 12b therein which are connected by the connecting rods 14a and 14b to the crankshafts 16a and 16b in the usual manner.

A power output shaft 18 is provided which is driven by the gears 20a and 20b on the crankshafts 16a and 16b meshing with and driving the gear 22 on the power output shaft 18.

Thus, as the pistons 12a and 12b reciprocate in the piston cylinder 10, they drive the power output or driveshaft 18 in the usual manner. Any desired arrangement of driving linkage, of course, may be utilized to provide the desired drive and drive ratios.

In order to reciprocate the cylinder 10, a cam or cams are provided on one of the driveshafts, for example, the cams 24 are provided on the crankshaft 16a which are engaged by the cam followers 26 disposed at the lower end of the cylinder 10. A spring 28 is provided and bears against the shoulder 30 of the cylinder 10 and the shoulder 32 of the engine block 34 so that the cam followers 26 are resiliently held against the cams 24 at all times. Thus, as the crankshaft 16a is rotated, the cylinder 10 is reciprocated as desired.

Any desired means, of course, may be utilized to provide the desired reciprocation of the cylinder 10. For example, referring to FIGURE 11, a gear drive is illustrated with the gear 24a substituted for the cams 24 which drives the gear 26a which has the connecting rod 27 connected to the cylinder 10. Thus, rotation of the crankshaft 16a causes a rotation of the gear 24a which drives the gear 26a which in turn through the connecting rod 27 reciprocates the cylinder 10.

Referring again to FIGURES 6 and 7, a plurality of air intake ports 36 are provided at one end of the cylinder 10 which reciprocate wholly within the air intake passage 40 of the engine block.

Similarly, a plurality of exhaust ports 42 are provided in the other end of the cylinder 10 which reciprocate wholly within the exhaust outlet 44 of the engine block.

It should be noted that the air inlet ports 36 and exhaust ports 42 are always open with respect to the air intake passage 40 and exhaust passage 44 and are only closed and opened by means of the position of the pistons 12a and 12b within the cylinder 10. This permits a much more efficient action and permits the exhaust ports 42 to be opened sooner thereby permitting more effective turbocharging of the cylinder 10.

In previous engines of the opposed piston type in which a sleeve or liner of the cylinder is reciprocated, considerable difficulty has been encountered in cooling the cylinder due to the fact that the water jacket or cooling jacket has been made stationary and due to thermal expansion and contraction of metals, it has not been possible to provide a satisfactory sealed off cooling jacket for the engine. This disadvantage is overcome in the present development by providing the cooling jacket as a part of and movable with the cylinder 10. This is accomplished by providing an enlargement 46 at the central or intermediate part of the cylinder 10 and forming, preferably by drilling the spaced water passages 46 the length of this section. The upper portion of the cooling passages 46 are closed by the shoulder arrangement 30 which includes the cooling outlet 50 and the closure 52 at the lower end including the cooling inlet 54.

This cooling arrangement is highly advantageous in that thermal expansion and contraction is improved in that heat stresses are minimized and the exhaust port bridges, which are difficult to cool, are effectively cooled. This cooling arrangement may, of course, be applied or adapted for any type engine.

Figure 8:
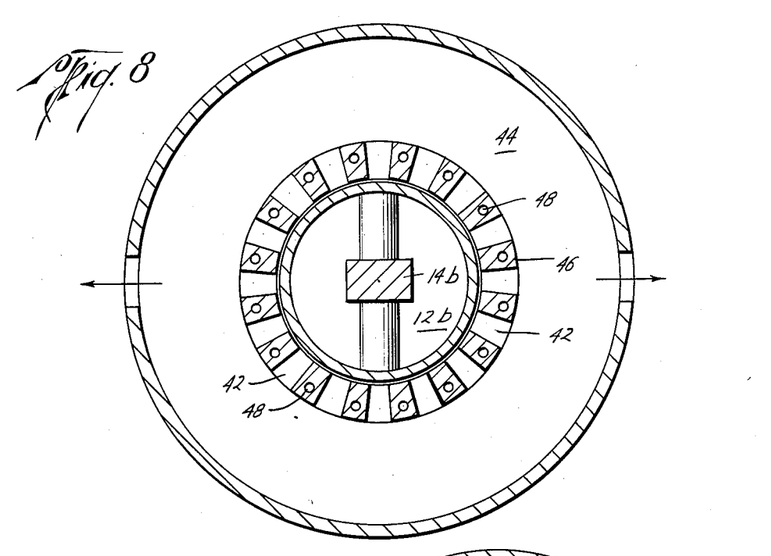
FIGURE 8 is a cross-sectional view taken along the line 8—8 of FIGURE 6.

A cross-sectional view of the arrangement of cooling passages 42 is illustrated in FIGURE 8 which shows the cooling passages 48 disposed between each of the exhaust ports 42. The arrangement provides effective cooling.

Figures 9, 10:
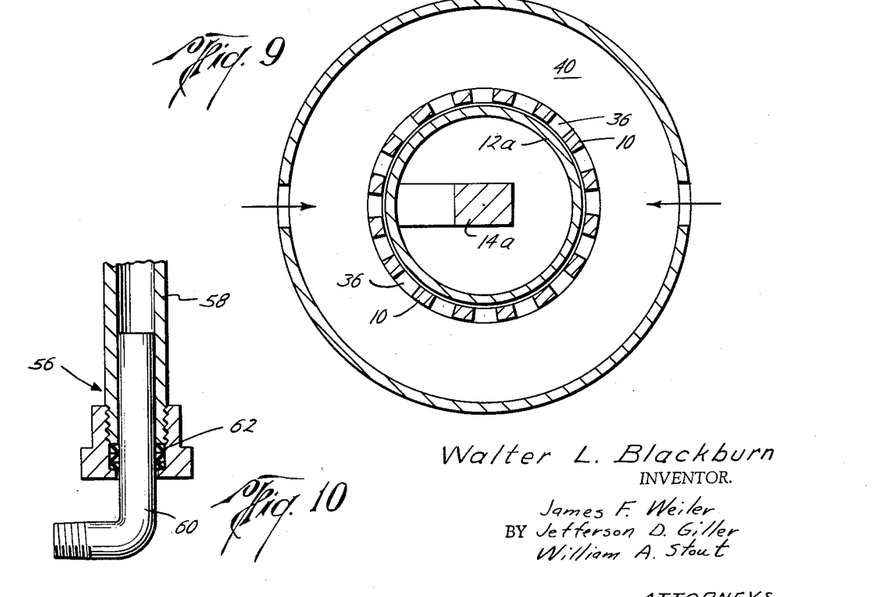
FIGURE 9 is a cross-sectional view taken along the line 9—9 of FIGURE 6.
FIGURE 10 is a fragmentary view, partly in section, illustrating a form of sliding connection for the cooling system.

Referring again to FIGURES 6 and 7, sliding water or cooling connections 56 are illustrated to permit the cylinder 10 to move relative to the pipes 58 of the cooling system. These are best illustrated in FIGURE 10, which illustrates the stationary pipe 58 and the connecting pipe 60 which moves through a stuffing box 62 disposed at the end of the pipe 58. Thus, as the cylinder 10 is reciprocated, the pipe 60 moves in the stationary pipe 58 of the cooling system.

Figures 11, 12, 13:
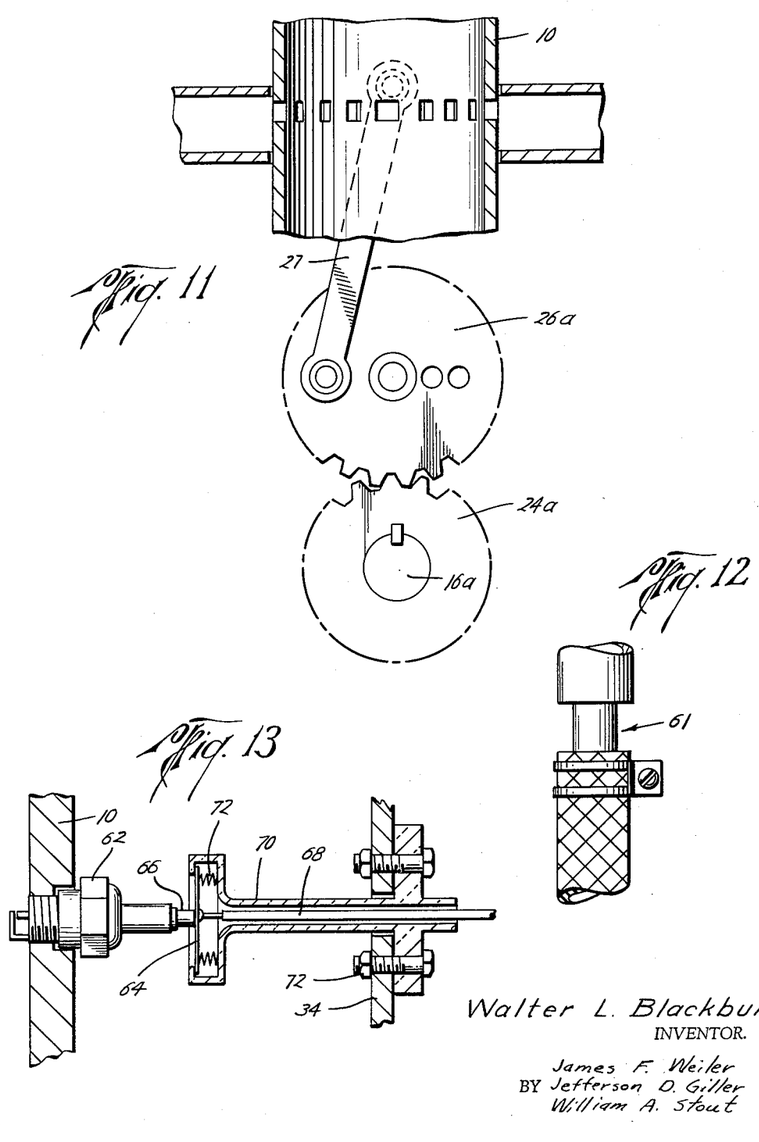
FIGURE 11 is a fragmentary view of the lower portion of FIGURE 6 illustrating a modification with respect to means for reciprocating the cylinder.
FIGURE 12 is a fragmentary elevation illustrating a flexible connection.
FIGURE 13 is a fragmentary side view, partly in section, illustrating a sliding electrical contact for the spark plug.

As best seen in FIGURE 12, a suitable flexible hose connection 61 is illustrated for the cooling or other piping employed in the engine.

Referring again to FIGURES 6 and 7, there is disposed in the central portion of the cylinder 10 a firing plug or spark plug 62, the details of which are best seen in FIGURE 13 to which reference is now made. The spark plug 62, of course, moves with the cylinder 10 and a sliding electrical contact therefor is provided by the contact plate 64 engaging the contact 66 of the spark plug 62. The plate contact 64 is connected by the electrical lead 68 and plate 64 are contained in the housing 70 secured to the engine block 34, such as by the nuts and bolts 72. In order to assure good electrical contact at all times, the electrical contact plate 64 is spring pressed by means of the springs 72 so that the electric contact plate 64 is resiliently held against the contact 66 of the spark plug 62 as it is reciprocated back and forth with the cylinder 10.

In the event the engine is of the diesel type rather than the gasoline type, the spark plug arrangement may be omitted.

The remaining parts of the engine of the present invention are conventional, may be either carburetor or injection type, and, accordingly, no detail description or discussion thereof is deemed necessary or appropriate.

Figure 1:
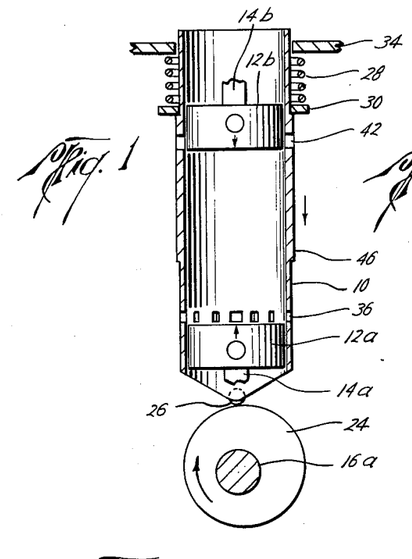
FIGURE 1 is a schematic, fragmentary elevation, in section, illustrating an engine of the opposed piston type with reciprocating cylinder with the parts in position during a portion of the compression stroke.

The sequence of operation is best illustrated in FIGURES 1–4, inclusive. Referring now to FIGURE 1, the pistons 12a and 12b and cylinder 10 are shown in position at the beginning of the compression stroke. It is noted that the pistons 12a and 12b are in their extended positions, that the lower piston 12a is below the air intake ports 36 thereby permitting supercharging of the cylinder 10 and that the upper piston 12b is closing off the exhaust ports 42. As previously mentioned, the air intake ports 36 and exhaust ports 42 are always open to their respective passages and are only closed off by the inner portions of the pistons 12a and 12b passing beyond the ports 36 and 42. At this point it is noted that the cylinder 10 is moving in a downward direction due to the spring 28 urging the cam follower 26 against the reduced diameter portion of the cam 24.

Figure 2:
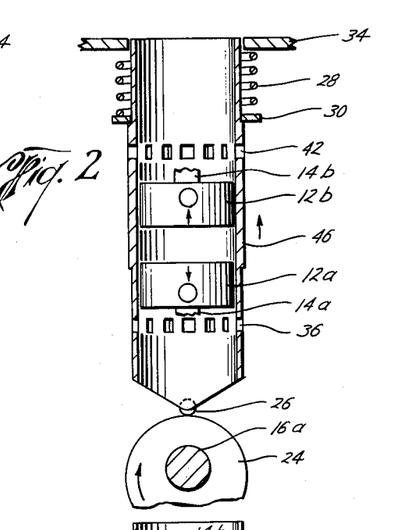
FIGURE 2 is a view similar to that of FIGURE 1 illustrating the parts in position during a portion of the expansion stroke.

FIGURE 2 illustrates the pistons 12a and 12b and cylinder 10 just after combustion and during the expansion stroke, the pistons 12a and 12b being moved away from one another and the cylinder 10 being moved upwardly. Note that the inlet ports 36 and the exhaust ports 42 are closed due to the relative position of the pistons 12a and 12b and cylinder 10. Also note that neither piston 12a nor 12b is trailing the other but that they are both being expanded simultaneously.

Figure 3:
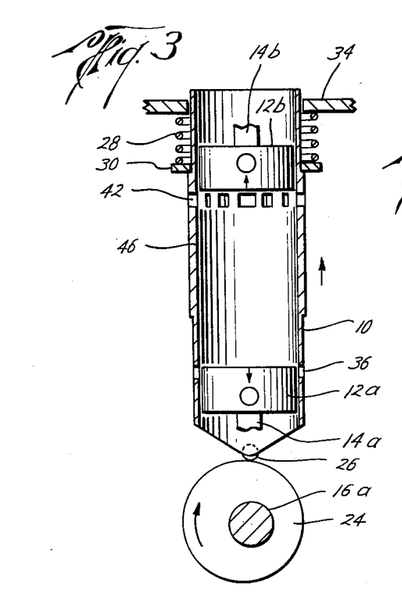
FIGURE 3 is a view similar to that of FIGURES 1 and 2 illustrating the parts in position during the exhaust portion of the stroke.
Figure 4:
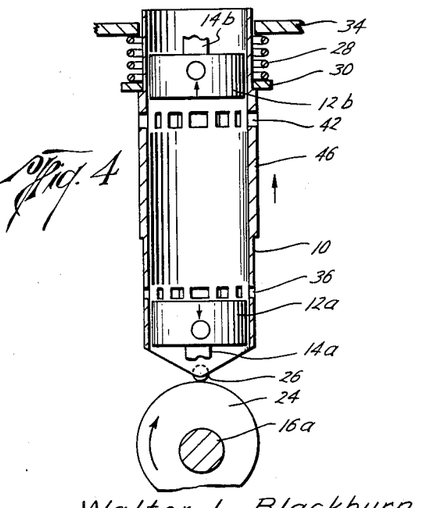
FIGURE 4 is a view similar to that of FIGURES 1, 2 and 3 illustrating the parts in position for intake into the cylinder.

FIGURE 3 illustrates the relative position of the pistons 14a and 14b and cylinder 10 during the exhaust cycle with the pistons 14a and 14b being moved almost into their completely expanded position. Note that the cylinder 10 is still being moved upwardly against the tension of the spring 28 until it reaches the position illustrated in FIGURE 4, to which reference is now made, where the cylinder 10 is moved upwardly to a point to move the inlet ports 36 above the lower piston 12a thereby permitting air to enter the cylinder 10 for scavenging purposes.

The next movement causes the parts to assume the position illustrated in FIGURE 1, to which reference is now made, and it is noted that the exhaust ports 42 are shut off first due to the upward movement of the cylinder thereby permitting a longer period for air to enter through the intake ports 36 in the cylinder 10 thereby supercharging the cylinder. The cycle then, of course, is repeated as previously described.

It is noted that the cooling jacket moves with and forms a part of the cylinder itself so that there is no problem with respect to thermal expansion and contraction of the parts relative to a sleeve moving with respect to a stationary cooling or water jacket. Also, in ignition type engines, the firing plug or spark plug moves with the cylinder as previously described. Of course, if fuel injectors are used instead of the spark plug, these are of course secured directly to the cylinder 46 and move with it as a unit.

Figure 5:
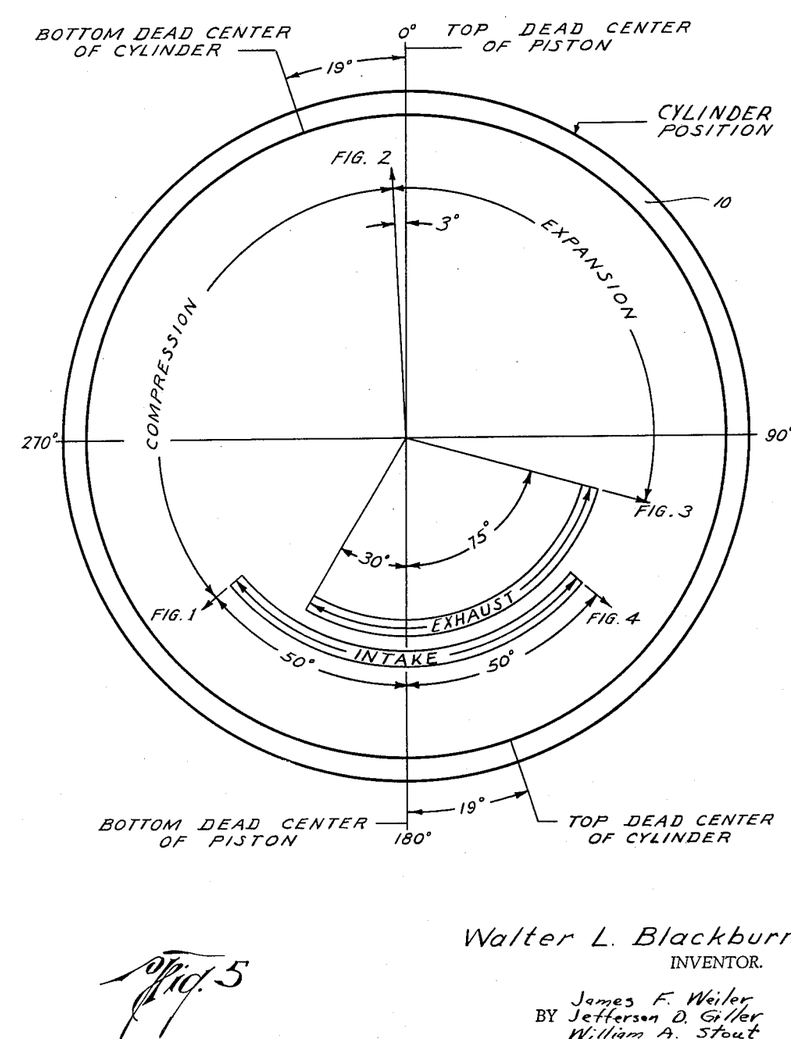
FIGURE 5 is a timing diagram.

The time cycle of intake, compression, expansion and exhaust is illustrated in the time cycle diagram of FIGURE 5 which makes reference during the cycle to position of the pistons and cylinder as shown in FIGURES 1–4, respectively. Thus, on the time cycle chart of FIGURE 5, FIGURE 1 to FIGURE 2 illustrates the compression cycle, FIGURE 2 the expansion cycle, FIGURE 3 the exhaust cycle which overlaps with the intake cycle of FIGURE 4. Also, the relative position of the liner is illustrated in that the bottom dead center of the cylinder with respect to the top dead center of the piston and the bottom dead center of the piston with respect to the top dead center of the cylinder is set forth. As illustrated in FIGURE 5 it has been found satisfactory to provide a 19° difference in the time cycle between the bottom and top dead center of the cylinder and the top and bottom dead center, respectively, of the piston. Also, note the relatively long period of air intake into the cylinder which provides supercharging and increased power.

Figure 18:
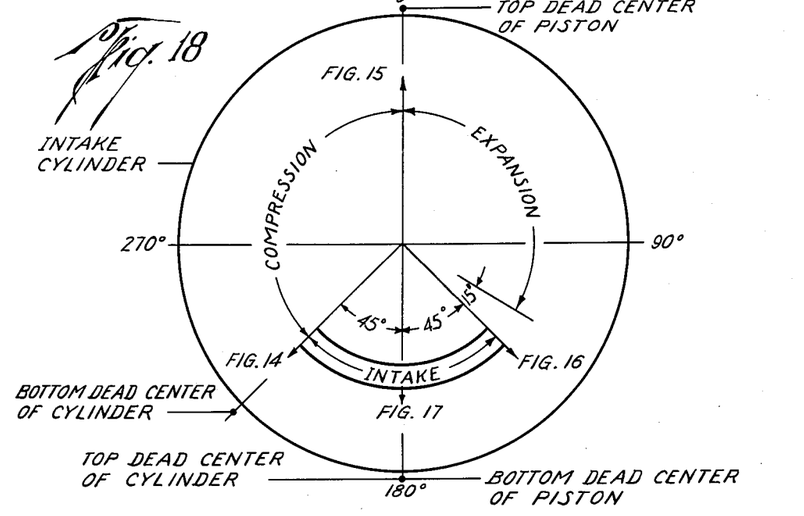
FIGURE 18 is a timing diagram of the intake cylinder in which the position of the parts of the intake cylinder and piston therein shown in FIGURES 14–17, inclusive, are illustrated.
Figure 19:
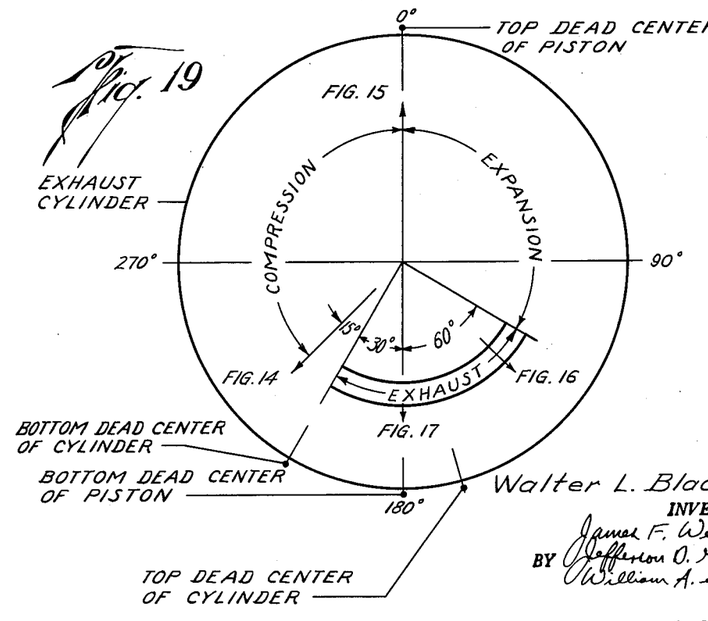
FIGURE 19 is a timing diagram of the exhaust cylinder in which the position of the parts of the exhaust cylinder and piston therein illustrated in FIGURES 14–17, inclusive, are set forth.
Figure 20:
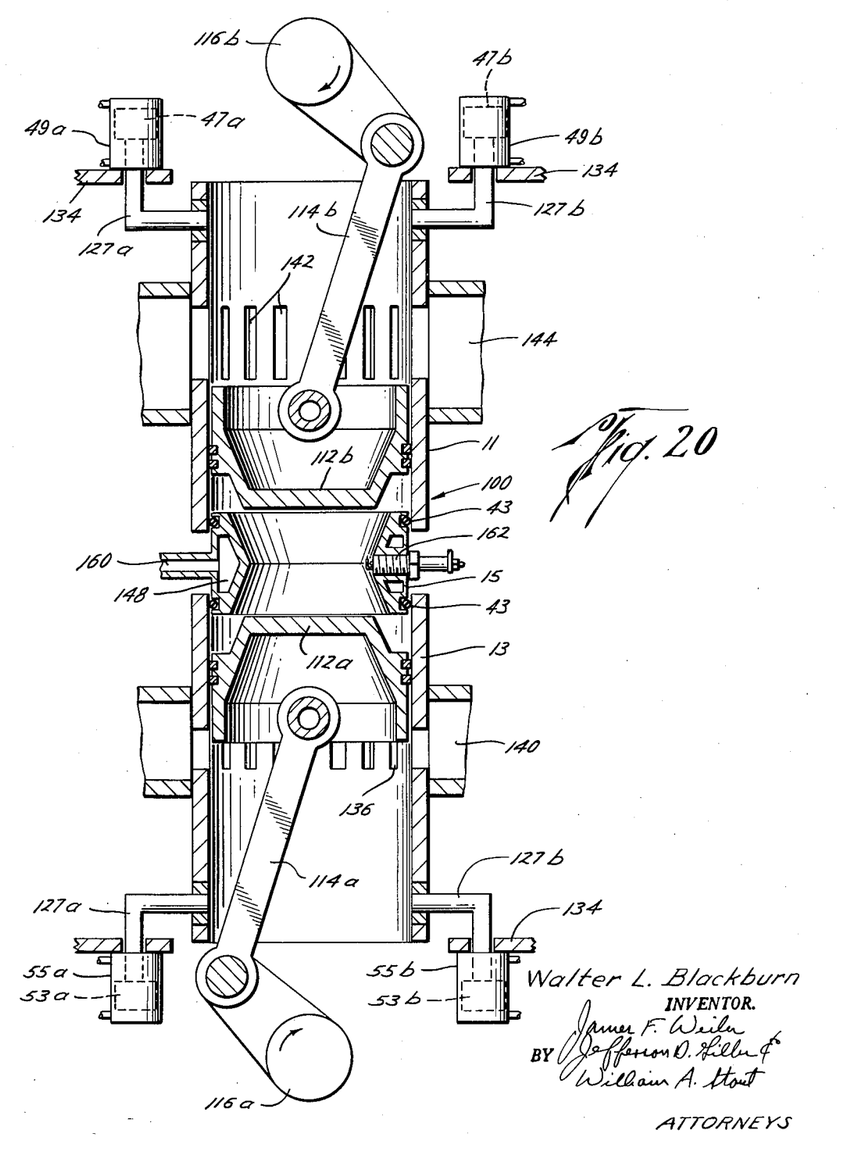
FIGURE 20 is an elevational view, in section, illustrating an opposed piston and split cylinder arrangement in accordance with the modification of FIGURES 14–17, inclusive.

Referring to the modification illustrated in FIGURES 14–22, inclusive, the parts of which are referred to in the one hundred series corresponding to those parts of FIGURES 1–13, inclusive, and particularly to FIGURE 20, a piston and cylinder arrangement 100 according to the invention is illustrated which includes what might be termed the exhaust cylinder 11 and an intake cylinder 13 movably disposed about opposite ends of the combustion chamber or zone 15. A pair of pistons 112b and 112a are disposed in the exhaust cylinder 11 and intake cylinder 13, respectively, which include the usual connecting rods 114b and 114a connecting these pistons to the crankshafts 116b and 116a, respectively.

The exhaust cylinder 11 has the exhaust ports 142 which move wholly within the exhaust outlet 144. Similarly, the intake cylinder 13 has a plurality of intake ports 136 which move wholly within the intake passage 140.

Thus, while the exhaust cylinder 11 and intake cylinder 13 are reciprocated back and forth, the exhaust ports 142 and intake ports 136 never move out of the exhaust passage 144 and intake passage 140.

The combustion chamber 15 includes a cooling passage 148 to which cooling liquid is provided by the cooling header 160. In the case of an internal combustion engine, the spark means of plug 162 is provided.

Thus, the combustion chamber 15 advantageously remains stationary and is cooled without having any movement of the cooling chamber relative to the combustion chamber. This advantageously permits a satisfactory seal at all times between the inner ends of the exhaust cylinder 11 and intake cylinder 13 and prevents leakage and binding due to expansion and contraction caused by variances in heating. To provide a seal the seal rings 43 are provided although any preferred sealing means may be utilized.

The pistons 112a and 112b, connecting rods 114a and 114b and crankshafts 116a and 116b are all conventional and no detailed description thereof is deemed necessary.

Any suitable means to reciprocate the exhaust cylinder 11 and intake cylinder 13 independently of one another may be utilized. As seen in FIGURE 20 a hydraulic system is provided which includes the pairs of arms 127a and 127b secured to the ends of the exhaust cylinder 11 and the intake cylinder 13 which are actuated by the pistons 47a and 47b in the cylinders 126a and 126b, respectively, and by the pistons 55a and 55b in the cylinders 53a and 53b, respectively.

Figure 21:
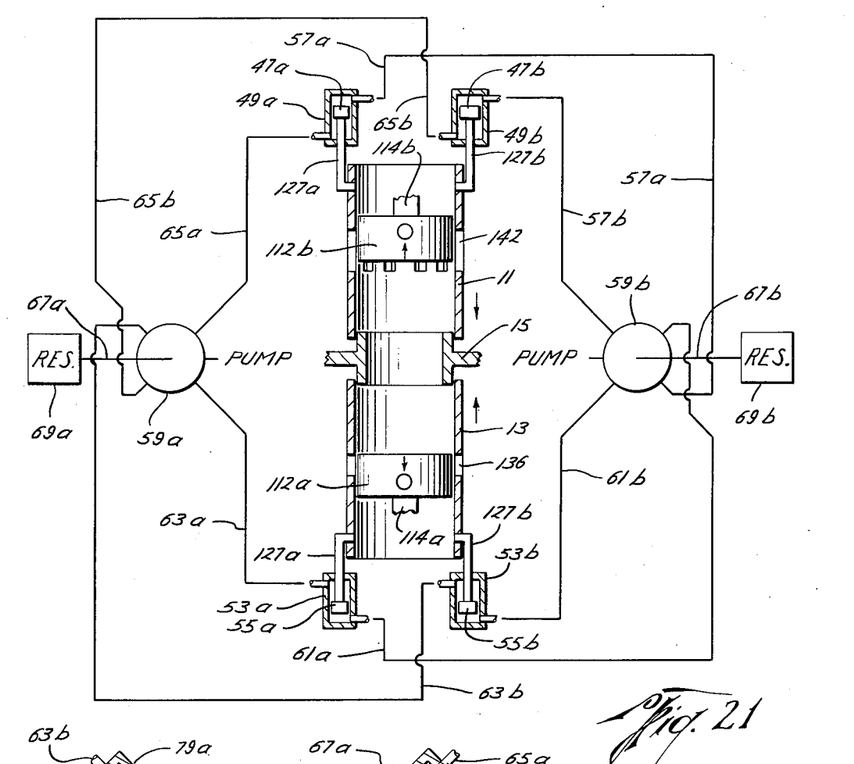
FIGURE 21 is a view similar to that of FIGURE 20 illustrating means for reciprocating the split cylinder elements.

The means for moving the pistons and cylinders is best illustrated in FIGURE 21, to which reference is now made. Connected to what might be termed the inner portions of the cylinders 47a and 47b are the hydraulic lines 65a and 65b, respectively, which extend from diametrically opposed portions of the pump 59a. Similarly, connected to what might be termed the inner portions of the cylinders 53a and 53b are the hydraulic lines 63a and 63b, respectively, which extend from diametrically opposed portions of the pump 59a. Thus, hydraulic pressure is introduced into and withdrawn from the inner portions of the cylinders and synchronized action is provided. Of course, if desired, equalizing lines, not shown, may be connected between the lines 65a and 65b and the lines 63a and 63b to insure uniform operation of the pistons moving each cylinder.

The arrangement for the pump 59b is similar to that for the pump 59a. Here, however, hydraulic lines are provided to what might be termed the outer portions of the cylinder. Thus, hydraulic lines 57a and 57b are connected to the outer portions of the cylinders 49a and 49b, respectively, and extend from diametrically opposed portions of the pump 59b. Similarly, the hydraulic lines 61a and 61b are connected to the outer portions of the cylinders 55a and 55b, respectively, and extend from diametrically opposed portions of the pump 59b. Also, equalizing lines, not shown, may be provided between the lines 57a and 57b and the lines 61a and 61b to insure uniform operation of the pistons.

Each of the pumps 59a and 59b is connected by the lines 67a and 67b, respectively, to the hydraulic reservoirs 69a and 69b, respectively.

Thus, the pumps 59a and 59b work in combination to provide hydraulic pressure alternately to each end of the cylinders 49a and 49b thereby moving the pistons 47a and 47b and to the cylinders 53a and 53b thereby moving the exhaust cylinder 11 and intake cylinder 13.

It is a matter of simple adjustment to provide the specific movement of one cylinder with respect to the other and the pumps work in combination to provide for a synchronized moving of the cylinders as desired.

Figure 22:
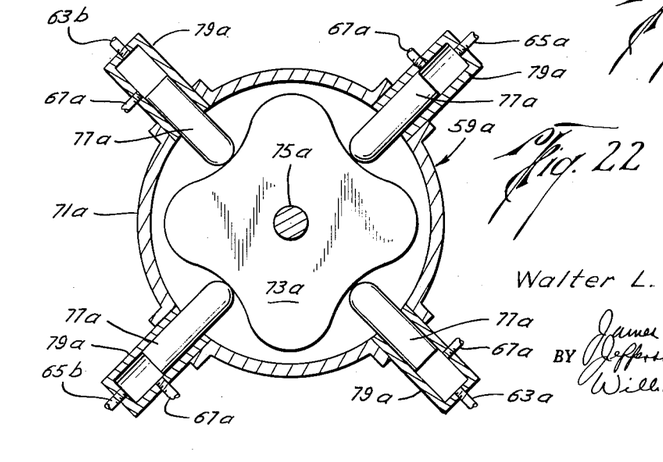
FIGURE 22 is a cross-sectional view illustrating a pump utilized in the system illustrated in FIGURE 21.

Referring to FIGURE 22 the pump 59a is illustrated which is of the radial hydraulic type and includes a housing 71a in which is rotatably disposed a rotor 73a secured to the shaft 75a which is rotated from the crankshaft, not shown in this view. It is noted that the rotor 73a is in essence a cam which reciprocates the cam followers which are slidably disposed within the cylinders 79a and which also serve as pistons so that upon reciprocation of the cam followers 77a hydraulic fluid entering the cylinders 79a from the hydraulic header 67a from the reservoir is pumped out in the diametrically-opposed lines 63a and 63b, and 65a and 65b and is drawn back in these lines for reciprocating the exhaust cylinder 11 and intake cylinder 13. While not shown in detail, the pump 59b is identical to the pump 59a and, as previously mentioned, these pumps work in combination so that the movement of the exhaust cylinder and intake cylinder is synchronized.

Figure 24:
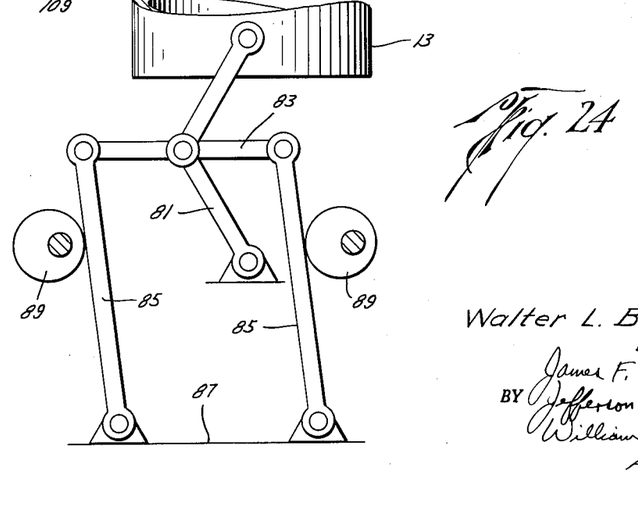
FIGURE 24 illustrates a still further modified means for reciprocating the cylinder or split cylinder portions.

If desired, instead of hydraulic means to reciprocate the exhaust cylinder 11 and intake cylinder 13, mechanical means may be utilized. Referring now to FIGURE 24, such a mechanical means is illustrated which includes, in effect, a toggle arm 81 pivotally connected to the cross arm 83 which is pivotally connected at each end to the arms 85 which are pivotally connected to a stationary part of the engine, such as at 87. A pair of cams 89 engage the outer sides of the arms 85 and cause these arms, which in effect serve as cam followers, to reciprocate back and forth thereby reciprocating the toggle arm 81 which is pivotally connected to the cylinder 13 and a stationary portion of the engine as previously described thereby reciprocating the cylinder. The same arrangement may also be utilized in connection with reciprocating the exhaust cylinder 11.

Figure 23:
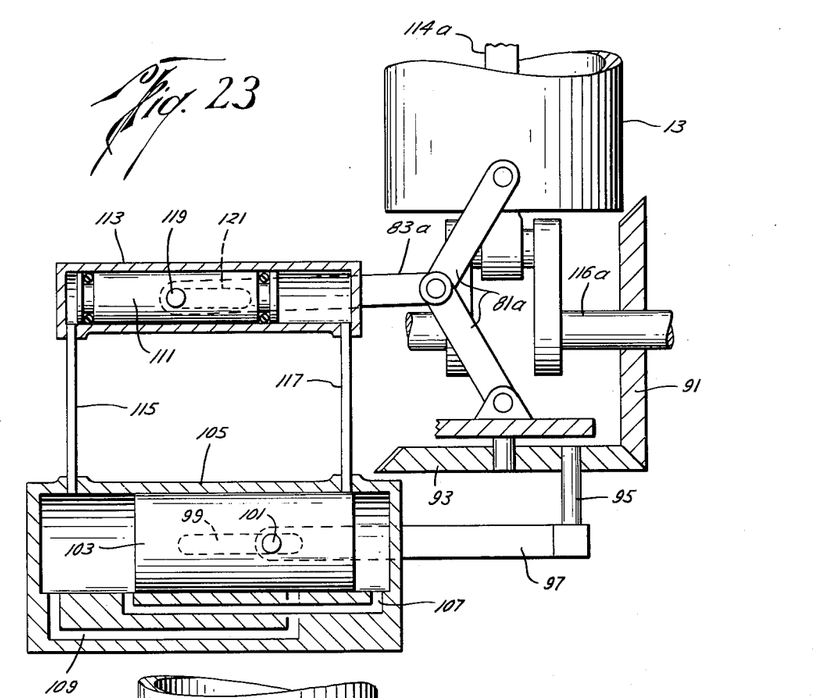
FIGURE 23 illustrates a modified means for reciprocating the cylinder or split cylinder elements.

Also, if desired, a combination of hydraulic and mechanical means may be utilized to reciprocate the exhaust cylinder 11 and intake cylinder 13. Such a means is illustrated in FIGURE 23, to which reference is now made. In this figure, a toggle arm 81a is connected, as described in connection with FIGURE 24, to the intake cylinder 13 and to a stationary part of the engine. A gear 91 is disposed on the crankshaft 116a which drives the gear 93 to which the crank arm 95 is secured which drives the crank 97 which is connected by the pin 101 projecting through the slot 99 to the piston 103 disposed in the cylinder housing 105. Thus, rotation of the crankshaft 116a rotates the gear 91 which drives the gear 93 thereby driving the crank arm 97 and reciprocating the piston 103 in the cylinder 105.

The cylinder 105 has the hydraulic passages 107 and 109 to permit hydraulic fluid to bypass the piston 103 in its movement and has a second piston 111 disposed in the cylinder 113, which cylinder 113 is connected at each end by the hydraulic lines 115 and 117 so that as the piston 103 is reciprocated hydraulic fluid is introduced first into one of the hydraulic lines 115 and 117 and then into the other thereby causing a reciprocation of the piston 111.

The piston 111 is connected by the pin 119 extending through the slot 121 in the cylinder 113 to the link arm 83a which moves the toggle arms 81a back and forth thereby causing a reciprocation of the cylinder.

By the arrangement illustrated a very smooth and predetermined movement of the cylinders is provided. A gear ratio of 2 to 1 is provided to obtain one complete oscillation of the cylinder for every revolution of the crankshaft.

Of course, while only one such combination hydraulic and mechanical means is illustrated, the identical unit is also provided for reciprocating the exhaust cylinder 11. While not shown in this view, the crankshafts 116a and 116b are interconnected, such as by gearing, and provide a common output and while only a single piston and cylinder arrangement is shown, obviously, a plurality of these or only a single unit may be utilized as desired.

Figures 14, 15, 16, 17:
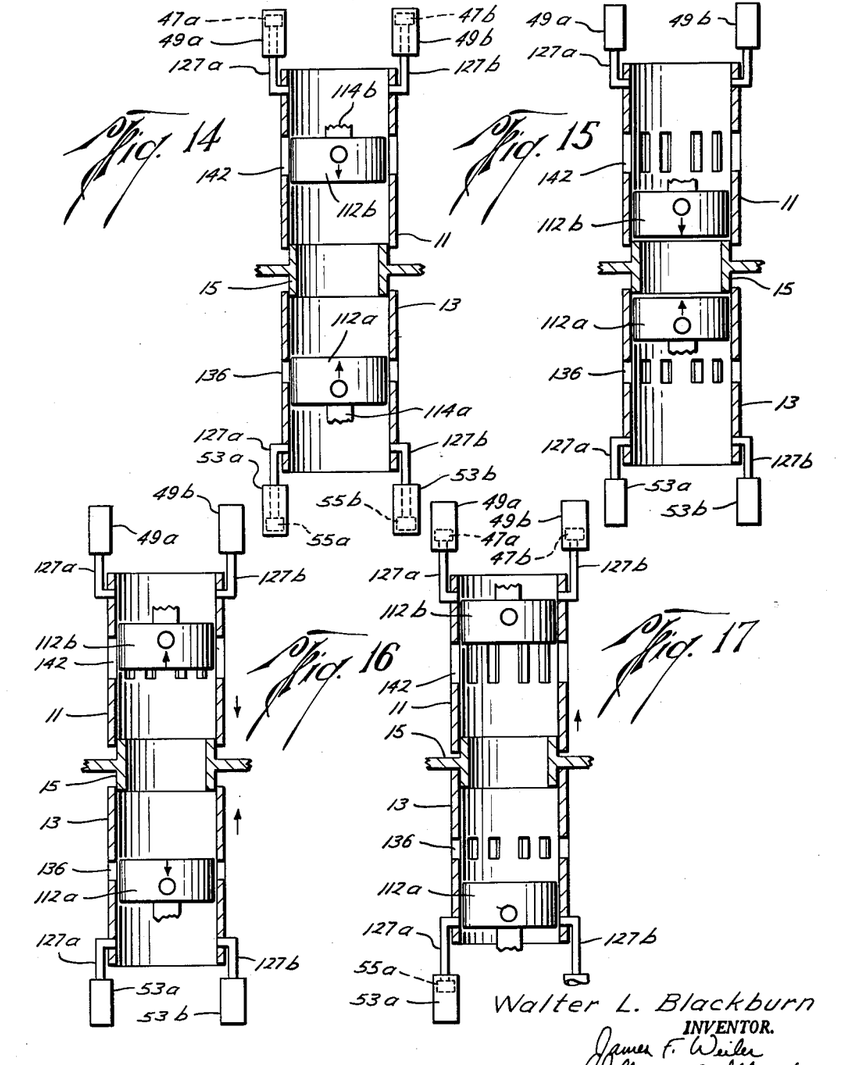
FIGURE 14 is a schematic, fragmentary elevation, in section, similar to FIGURE 1, illustrating a modification in which the parts are in position for beginning the compression stroke, both cylinder portions being on bottom dead center and both inlet and exhaust ports being closed.
FIGURE 15 is a view similar to that of FIGURE 14 in which the parts are in position at the end of the compression stroke with both cylinder portions on bottom dead center and both pistons about 2° off top dead center.
FIGURE 16 is a view similar to that of FIGURE 14 in which the parts are in position at the end of the expansion stroke with the exhaust ports open for about 15° and the intake ports ready to open.
FIGURE 17 is a view similar to that of FIGURE 14 in which both pistons are at bottom dead center, the intake cylinder is at top dead center and the exhaust cylinder is about 15° off top dead center.

The operation of the piston and cylinder arrangement of FIGURES 14–25, inclusive, is best illustrated in FIGURES 14–17, inclusive, to which reference is now made. Turning first to FIGURE 14, the pistons and exhaust and inlet cylinders are illustrated in position at the beginning of the compression stroke, both cylinders are at bottom dead center, both the exhaust ports 142 and intake ports 136 are closed by the pistons 112b and 112a, respectively.

In FIGURE 15, the end of the compression stroke is shown and both cylinders are still on bottom dead center and both pistons are on top dead center.

In FIGURE 16 the end of the expansion stroke is illustrated, the exhaust ports 142 have been open for about 15° and the intake ports 136 are ready to be opened. In FIGURE 17 both pistons are shown at the bottom dead center and the intake cylinder 13 is at top dead center with the exhaust cylinder 11 about 15° off top dead center.

Thus, during the cycle the exhaust cylinder 11 leads the intake cylinder 13 by about 15°.

This leading of the exhaust cylinder over the intake cylinder is illustrated in FIGURES 18 and 19 which illustrate the timing diagrams for the intake cylinder 13 and the exhaust cylinder 11.

As previously explained, the means for moving the exhaust cylinder and the intake cylinder are so synchronized to provide this leading of the exhaust cylinder and also which permits the cylinders to remain at bottom dead center and top dead center momentarily in order to provide more efficient results.

Of course, other timing cycles may be utilized as desired.

Figure 25:
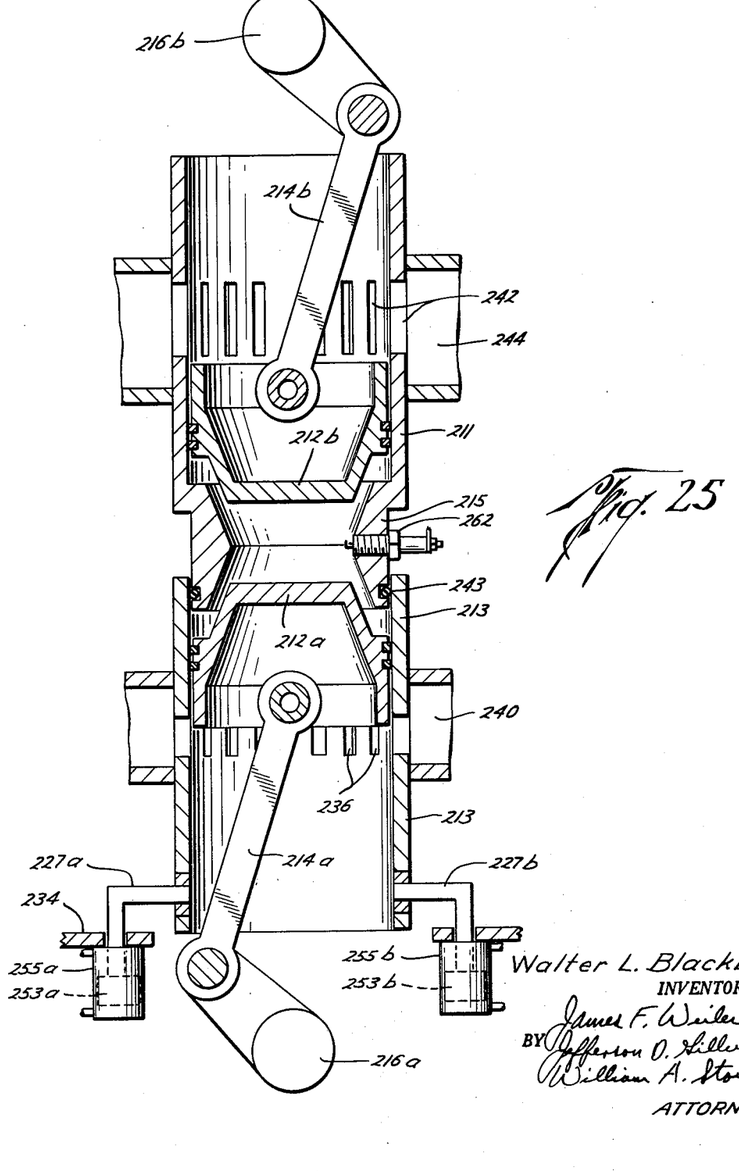
FIGURE 25 illustrates a still further modification of the cylinder arrangement.

If desired, only the exhaust or intake cylinder may be reciprocated. FIGURE 25 illustrates such an arrangement to which reference is now made, the parts of which corresponding to those of the previous figures are indicated in the two hundred series for convenience of reference. In this form only the intake cylinder 213 is reciprocated. The combustion chamber 215 and exhaust cylinder 211 are stationary and the inlet cylinder 213 is moved as previously described. All other parts and mode of operation are the same except the exhaust cylinder 211 is not moved.

Obviously, the exhaust cylinder 211 may be moved and the inlet cylinder 213 remain stationary.

By moving either or both the exhaust and intake cylinders controlled opening and closing of the exhaust and inlet ports is advantageously provided.

As previously mentioned any desired means may be used to move the entire cylinder or a portion or portions of these cylinders and the arrangements for this purpose described in some detail with the various forms of the invention may, of course, be used with the other forms of the invention.

The engine, of course, may include one or more of the opposed piston and cylinder assembly and may be used for either diesel or gasoline type engines. The engine is also well adapted for use as a reversible engine.

The present invention is therefore well suited and adapted to attain the ends and objects and has the advantages and features mentioned as well as others inherent therein.

While presently preferred examples of the invention have been given for the purpose of disclosure, changes in details and arrangement of parts may be made which are within the spirit of the invention and the scope of the appended claims.

What is claimed is:

1. An engine comprising, a cylinder provided with inlet ports adjacent one end portion and exhaust ports adjacent the other end portion, a pair of opposed pistons slidably mounted in the cylinder, a pair of crankshafts, one each of said pistons connected to and driving one each of the crankshafts, linkage connecting the pair of crankshafts together so that said pistons simultaneously move away and toward each other in the cylinder, means for reciprocating the cylinder in response to rotation of at least one of the crankshafts whereby the opening and closing of said inlet and exhaust ports are controlled by the inner edges of the pistons sliding across and beyond said ports as said cylinder is reciprocated, an annular inlet header slidably disposed about the cylinder and about said inlet ports, and an annular exhaust header slidably disposed about said cylinder and about said exhaust ports, both said headers arranged and disposed so that said ports remain wholly within said headers during reciprocation of the cylinder.

2. The invention of claim 1 where the means for reciprocating the cylinder comprises a cam secured to one of the crankshafts, a cam follower secured to one end of the cylinder and engaging and following the cam, and a spring engaging and yieldably urging the cylinder and thereby the cam follower against the cam.

3. The invention of claim 1 where the means for reciprocating the cylinder comprises a gear element secured to one of the crankshafts and a gear arm mounted eccentrically on said gear and connected to the cylinder.

4. The invention of claim 1 where the means for reciprocating the cylinder in response to rotation of the crankshaft is so constructed and arranged that bottom dead center of the cylinder is approximately 19° behind top dead center of the piston and top dead center of the cylinder is approximately 19° behind bottom dead center of the piston.

5. An engine comprising, an exhaust cylinder, an intake cylinder axially aligned with said exhaust cylinder, an intermediate combustion chamber joining said exhaust and intake cylinders, said exhaust cylinder and said intake cylinder provided with ports, a pair of opposed pistons, one each slidably mounted in the exhaust cylinder and the intake cylinder, a pair of crankshafts, one each of said pistons connected to and driving one each of the crankshafts, linkage connecting the pair of crankshafts together so that said pistons move away and toward each other in a predetermined relationship, at least one of said cylinders movably disposed, means for reciprocating said one cylinder in response to rotation of at least one of the crankshafts, the opening and closing of said inlet and exhaust ports controlled by relative movement of the inner ends of the pistons across and beyond said ports, an inlet header disposed about the ports of the intake cylinder, and an exhaust header disposed about the ports of the exhaust cylinder, the header disposed about said one movably disposed cylinder being slidably disposed about said cylinder and the ports thereof so that said last-mentioned ports remain wholly within said last-mentioned header during reciprocation of said one cylinder.

6. The engine of claim 5 where the combustion chamber is stationary, said one cylinder moving relative to said combustion chamber.

7. The engine of claim 5 where the intermediate combustion chamber is stationary and both said inlet cylinder and said exhaust cylinder are movable relative to the combustion chamber, and where said means for moving said one cylinder comprises means for separately reciprocating the intake cylinder and the exhaust cylinder in response to rotation of the crankshaft.

8. Th engine of claim 7 where the exhaust cylinder leads the intake cylinder during reciprocation by about 15°.

References Cited in the file of this patent

UNITED STATES PATENTS

| | | |
|---|---|---|
| 1,820,069 | Herr | Aug. 25, 1931 |
| 2,097,741 | Schmid | Nov. 2, 1937 |
| 2,144,706 | Pescara | Jan. 24, 1939 |
| 2,646,779 | Fiser | July 28, 1953 |
| 2,853,982 | Bachle | Sept. 30, 1958 |

FOREIGN PATENTS

| | | |
|---|---|---|
| 18,706 | Great Britain | Aug. 9, 1910 |
| 714,459 | Great Britain | Aug. 25, 1954 |